United States Patent [19]

Inoue

[11] Patent Number: 4,484,070

[45] Date of Patent: Nov. 20, 1984

[54] SHEET DETECTING DEVICE

[75] Inventor: Shunzo Inoue, Yokohama, Japan

[73] Assignee: Canon Kabushiki Kaisha, Tokyo, Japan

[21] Appl. No.: 370,477

[22] Filed: Apr. 21, 1982

[30] Foreign Application Priority Data

Apr. 30, 1981 [JP] Japan .................................. 56-65398
Sep. 28, 1981 [JP] Japan ............................... 56-153488

[51] Int. Cl.³ ............................................. G01V 9/04
[52] U.S. Cl. ................................ 250/223 R; 271/258; 271/265
[58] Field of Search ................ 250/571, 223 R, 222.1, 250/572; 356/382, 445; 271/258, 259, 261, 265

[56] References Cited

U.S. PATENT DOCUMENTS 4,281,244 7/1981 Murata et al. .................. 250/223 R

FOREIGN PATENT DOCUMENTS 2758532 7/1979 Fed. Rep. of Germany ... 250/222.1

Primary Examiner—David C. Nelms
Assistant Examiner—Ernest Austin II
Attorney, Agent, or Firm—Fitzpatrick, Cella, Harper & Scinto

[57] ABSTRACT

A device in which a light source and a light receiving element are disposed at one side of a sheet transportation path and a reflecting member is disposed at the other side of the sheet transportation path so that a light ray emitted from the light source is reflected by the reflecting surface of the reflecting member and is caused to enter the light receiving element and any variation in the quantity of light entering the light receiving element is detected to thereby detect the presence of a sheet. The reflecting member is disposed such that the angle formed by the normal to the reflecting member with the surface of the sheet placed at the detection position is equal to or smaller than the critical angle at which total reflection is created on the surface of the sheet.

14 Claims, 13 Drawing Figures

SHEET DETECTING DEVICE

BACKGROUND OF THE INVENTION

1. Field of the Invention

This invention relates to a sheet detecting device for detecting a transparent or non-transparent sheet.

2. Description of the Prior Art

In copying apparatus, microfilm cameras, microfilm readers or the like, a sheet-like original or a sheet such as microfilm is fed and detected by a detecting device and when the sheet has been detected, the feeding of the sheet is stopped or other operation of the apparatus is controlled.

This detecting device has been provided with a light emitting element and a light receiving element and has detected the presence of a sheet by one of the methods illustrated in FIGS. 1 to 3 of the accompanying drawings. In FIG. 1, reference numeral 1 designates a sheet moving in the direction of the arrow, reference numeral 2 denotes a light emitting element, and reference numeral 3 designates a light receiving element. The light emitted from the light emitting element 2 is reflected by the surface of the sheet 1 and the reflected light is caused to enter the light receiving element 3 and any variation in the quantity of light entering the light receiving element 3 is detected to thereby detect the presence of the sheet. This method suffers from no problem where the sheet moves while being maintained in a predetermined planar condition, but if the sheet is fed while being curved or with the surface thereof inclined relative to the horizontal plane, the direction of the reflected light will vary and the reflected light from the surface of the sheet will not properly enter the light receiving element 3 and this may lead to a problem that the light receiving element 3 does not properly detect the presence of the sheet although the sheet is placed at the predetermined detection position. In this case, if the detection level of the detecting circuit receiving the output signal of the light receiving element is reduced so that the presence of the sheet may be detected even when the quantity of light entering the light receiving element 3 has been reduced by the inclination of the surface of the sheet, the presence of the sheet can be properly detected even if the surface of the sheet is varied, but in that case, the device is liable to be affected by noise and there occurs a new problem that malfunction is caused. Also, in a case where a sheet having a diffusing surface such as paper is to be detected, the difference between the quantity of light entering the light receiving element 3 when the sheet is present at the detection position and the quantity of light entering the light receiving element 3 when the sheet is not present at the detection position is small and this also leads to a problem that malfunction is caused. In any case, there has been a problem that the device is affected by extraneous light and although the sheet is not present at the detection position, there is caused a malfunction that a sheet detection signal is put out from the light receiving element by mistake.

FIG. 2 shows a detecting device in which the light emitting element 2 and the light receiving element 3 are disposed in opposed relationship with the movement path of the sheet 1 interposed therebetween. In this detecting device, when the sheet 1 is not present between the light emitting element 2 and the light receiving element 3, the light from the light emitting element 2 enters the light receiving element 3, whereby the light receiving element 3 does not put out a sheet detection signal and, when the sheet 1 is present between the light emitting element 2 and the light receiving element 3, the light from the light emitting element does not enter the light receiving element 3, whereby the light receiving element 3 puts out a sheet detection signal. This method suffers from a difficulty that the sheet cannot be detected if it is a transparent film.

FIG. 3 shows a detecting device in which the light emitting element 2 and the light receiving element 3 are disposed at one side of the sheet transportation path and a reflecting plate 4 is disposed at the other side of the sheet transportation path. In this detecting device, the light receiving element 3 receives the light reflected by the reflecting plate 4. This method, like the method of FIG. 2, cannot detect transparent sheets.

As described above, none of the detecting methods of the prior art could reliably detect the presence of all of transparent sheets, non-transparent sheets, sheets having a diffusing surface and sheets of which the surface planarity and inclination angle are variable.

SUMMARY OF THE INVENTION

It is an object of the present invention to eliminate the above-noted disadvantages and to provide a detecting device which is capable of reliably detecting sheets.

It is another object of the present invention to provide a detecting device which is capable of detecting various types of sheets.

It is still another object of the present invention to provide a detecting device which is capable of accurately and quickly detecting transparent sheets, non-transparent sheets, sheets of different surface conditions and curved or inclined sheets.

The invention will become fully apparent from the following detailed description thereof taken in conjunction with the accompanying drawings.

DESCRIPTION OF THE PREFERRED EMBODIMENTS

Figure 1:
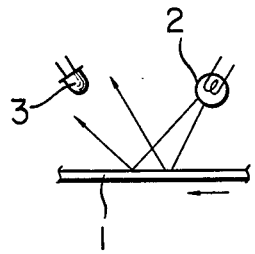
FIGS. 1, 2 and 3 show the constructions of the detecting devices according to the prior art.
Figure 2:
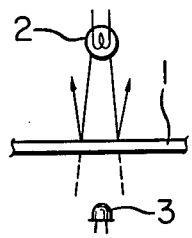
Figure 3:
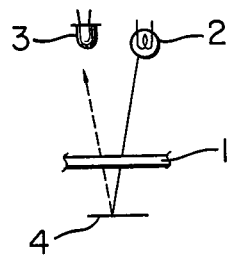
Figure 4:
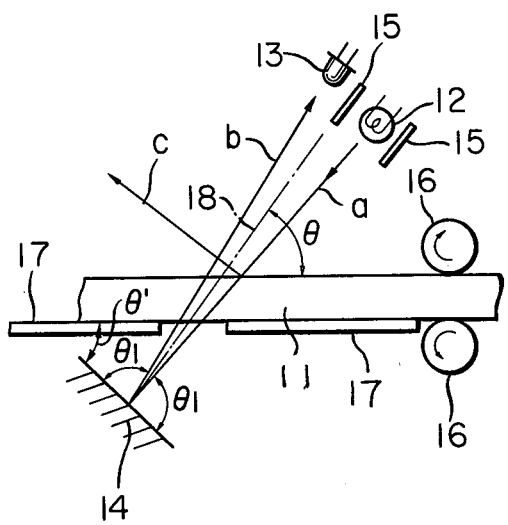
FIG. 4 shows the construction of a detecting device to which the present invention is applied.

In the sheet detecting device shown in FIG. 4, reference numeral 11 designates a sheet fed along a predetermined sheet feeding path, reference numeral 12 denotes a light emitting element comprising a lamp or the like for illuminating a predetermined area of the path, reference numeral 13 designates a light receiving element comprising a photoelectric conversion element or the like, reference numeral denotes a reflecting member comprising a plane mirror disposed in opposed relationship with the light emitting element 12 and the light receiving element 13 with the sheet feeding path interposed therebetween, reference numeral 15 designates a light intercepting plate for directing the light of the light emitting element 12 only in a predetermined direction, reference numerals 16 denote feed rollers for feeding the sheet 11, and reference numeral 17 designates a sheet guide plate disposed along a predetermined path. The light emitting element 12 is disposed at one side of the normal 18 to the reflecting member 14 and the light receiving element 13 is disposed at the other side of the normal 18, and the principal ray a of the light beam emitted from the light emitting element 12 is reflected by the surface of the reflecting member 14 and the reflected light b enters the light receiving element 13. The normal 18 to the reflecting member 14 forms an angle $\theta$ with the surface of the sheet 11 (hereinafter that side of the sheet 11 which faces the light emitting element 12 will be referred to as the surface), and this angle (90°$-\theta$) which is formed by the normal 18 with the line normal to the sheet surface is set to an angle larger than the critical angle creating total reflection on the surface of the sheet 11. That is, the surface of the reflecting member 14 is disposed so as to be inclined at an angle $\theta'(\theta'=90-\theta)$ with respect to the plane of the sheet feeding path.

In the above-described device, when there is no sheet being fed on the feeding path, the light a of the light emitting element 12 is reflected by the surface of the reflecting member 14, and the reflected light b reaches the light receiving element 13, whereby the light receiving element 13 does not put out a sheet detection signal.

Next, when the sheet 11 is fed onto the feeding path by the feed roller 16 and arrives at a detection position crossing the light path passing through the light emitting element 12 and the reflecting member 14, the light a of the light emitting element 12 is intercepted by the sheet and totally reflected by the surface of the sheet, and the reflected light c travels in the direction of the arrow. Accordingly, when the sheet is at the detection position, even if the sheet 11 is transparent, the illuminating light a does not reach the reflecting member 14 and therefore, the reflected light does not at all enter the light receiving element 13, whereby the light receiving element 13 puts out a sheet detection signal.

With the above-described construction, whether a non-transparent sheet or a transparent sheet is used, the sheet can be reliably detected and, even if, during the feeding of the sheet, the sheet becomes curved or the surface of the sheet becomes inclined with respect to the plane of the feeding path, the sheet can be reliably detected and there is no possibility of malfunction occurring. Further, whether a sheet such as paper having a surface of high diffusing property or a sheet such as film having a smooth surface is used, the sheet can be reliably detected and there is no possibility of malfunction occurring due to extraneous light and thus, any sheet can be detected accurately and quickly.

Figure 5:
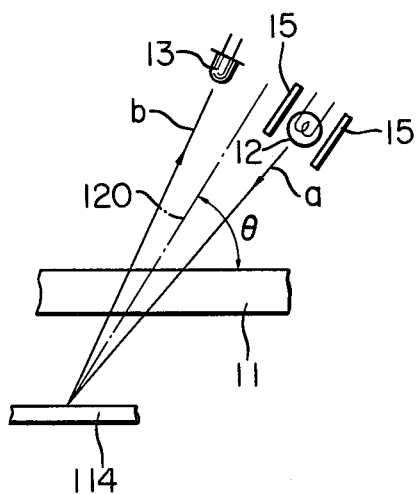
FIG. 5 shows the construction of another embodiment of the detecting device.
Figure 6:
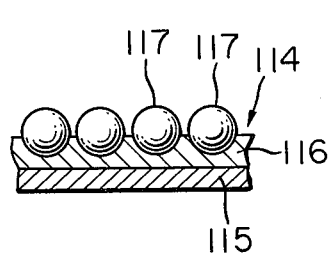
FIG. 6 is a cross-sectional view of the reflecting member shown in FIG. 5.
Figure 7:
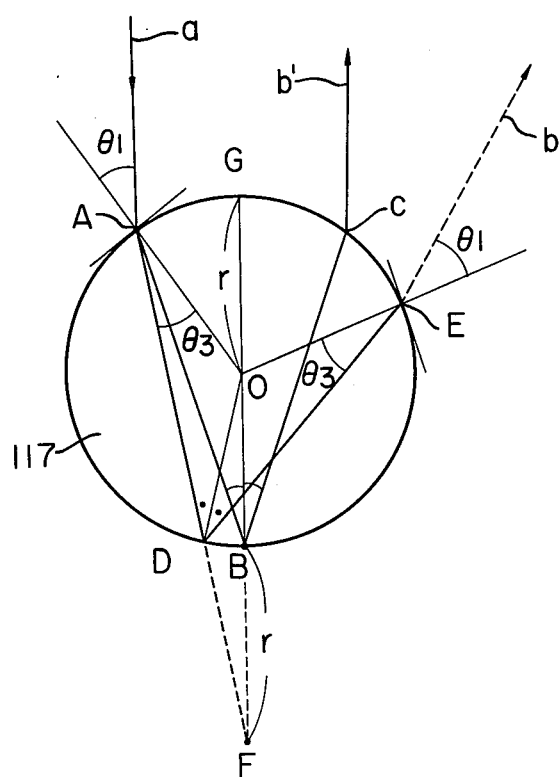
FIG. 7 illustrates the optical performance of the reflecting member shown in FIG. 5.

FIG. 5 shows another embodiment of the present invention which employs a reflecting member having a special reflecting surface. In FIG. 5, members similar in construction and function to those in the embodiment of FIG. 4 are given similar reference numerals. The difference of the FIG. 5 embodiment from the FIG. 4 embodiment lies in that instead of the reflecting member 14 of FIG. 4 comprising a plane mirror, use is made of a reflecting member 114 having a number of minute spherical beads embedded therein. The details of the reflecting member 114 are shown in FIG. 6, wherein the reflecting member 114 is of such a construction that a transparent binder 116 consisting of synthetic resin is provided on a support sheet 115 and spherical transparent glass beads 117 are partly embedded in the binder 116. The optical action of these glass beads 117 will be described by reference to FIG. 7. Assuming that the radius of each glass bead 117 is r, that the refractive index thereof is $n_2$ and that the refractive index of air is $n_1$, a light ray a entering the bead 117 is refracted at the boundary between the beads, and the position whereat the refracted light intersects the extension of a line GO parallel to the light ray a and passing through the center of the glass bead 117 is expressed as $$\frac{r \cdot n_2}{(n_2 - n_1)}.$$

Assuming that $n_1 = 1$ and $n_2 = 2$, the value of the above formula is 2r, and the light ray a incident on a point A is refracted in the bead and reaches a point B in the boundary surface between the glass bead and the binder. The light reflected at the point B reaches a point C symmetric with the point A with respect to a line BO and is again refracted there, and exits from the bead 117 as a reflected light b'. Accordingly, the incident light a and the reflected light b' become parallel to each other.

Assuming that the refractive index of the glass bead 117 is 1.5, the value of the above formula is 3r, and the light ray a incident on the point A is refracted by the bead and travels toward a point F on the extension of the line GO, and is reflected at a point D on the boundary surface between the glass bead and the binder and travels toward a point E, whereat it is refracted and exits as a reflected light b. Thus, the light ray incident on the reflecting member 114 is reflected by the reflecting member 114 while being slightly widened relative to the incident light a. That is, this reflecting member 114, when the surface thereof is assumed to be planar, has a reflection characteristic in which the incidence angle of the incident light on the normal to that plane differs from the reflection angle of the reflected light. A material having a refractive index $n_2 < 2$ may be used as the material of the beads 117, and glass ($n_2 = 1.52$) or acrylic resin ($n_2 = 1.49$) is a suitable material. The angle at which the reflected light is widened relative to the incident light is determined by the refractive index of the bead. In FIG. 5, the bisecting line 120 between the incident light a and the reflected light b corresponds to the normal 18 of FIG. 4, and the reflecting member 114 is disposed so that the angle formed by the bisecting line 120 with the surface of the line normal to the sheet 11 is larger than the critical angle creating total reflection on the surface of the sheet 11.

Again in the construction shown in FIG. 5, as in the construction shown in FIG. 4, when the sheet 11 is not present at the detection position, the illuminating light a of the light emitting element 12 is reflected by the reflecting member 114 and the reflected light b reaches the light receiving element 13. Next, when the sheet 11 arrives at the detection position, the illuminating light a of the light emitting element 12 is totally reflected by the surface of the sheet 11 and even if the sheet is transparent, the illuminating light a does not reach the reflecting member 114 and accordingly, the reflected light does not at all enter the light receiving element 13, whereby the sheet can be detected.

By using the reflecting member as shown in FIG. 5, the necessity of accurately setting the angle of the reflecting member 114 relative to the light emitting element 12 and the light receiving element 13 is eliminated and accordingly, it becomes unnecessary to adjust the relative position and angle of the light emitting element 12, the reflecting member 114 and the light receiving element 13.

Figure 8:
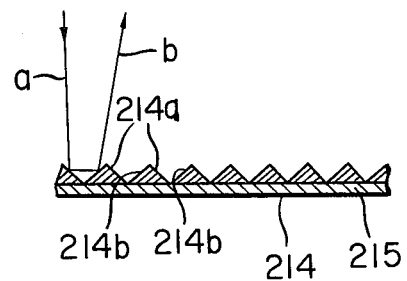
FIG. 8 is a cross-sectional view showing another embodiment of the reflecting member.

FIG. 8 shows a further embodiment of the reflecting member. This reflecting member 214 is of such a construction that a number of planar reflecting surfaces 214a and 214b intersecting each other at an angle greater than 90° are juxtaposed on a support member 215. A light ray a incident on this reflecting member 214 is reflected by the reflecting surface 214a and then reflected by the reflecting surface 214b and exits from the reflecting member 214 as a reflected light b. The reflected light b is reflected while being slightly widened relative to the incident light a. The angle at which this reflected light is widened is determined by the angle of intersection between the two reflecting surfaces 214a and 214b.

FIGS. 9 to 13 show further embodiments of the present invention. In these figures, members similar in construction and function to those of the previously described embodiment are given similar reference numerals.

Figure 9:
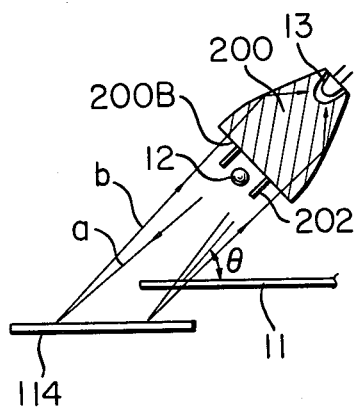
FIG. 9 shows the construction of still another embodiment of the detecting device.
Figure 10:
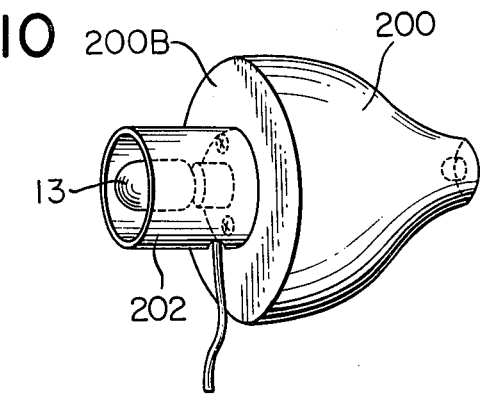
FIG. 10 is a perspective view of a light guide member.
Figure 11:
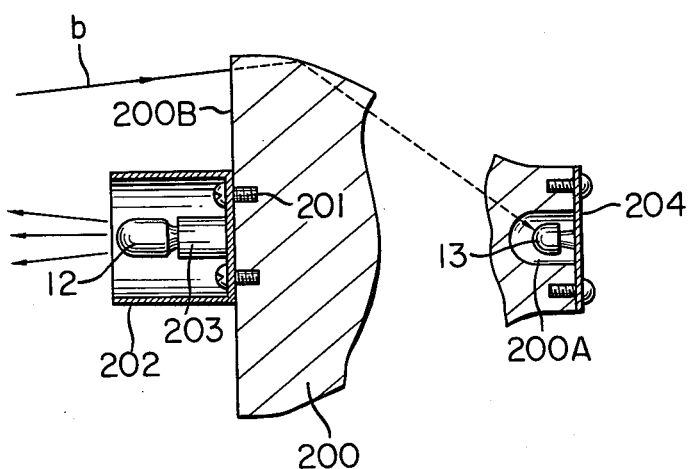
FIG. 11 is a cross-sectional view of the light guide member.

In FIG. 9, a light guide member 200 formed of a transparent material such as glass or the like is disposed between the light emitting element 12 and the light receiving element 13. The light guide member 200 is formed into a substantially conical shape as shown in FIG. 10. A light intercepting cylinder 202 is fixed to the central portion of one end surface of the light guide member 200 by means of screws 201, a socket 203 is disposed in the cylinder 202, and the light emitting element 12 is held by the socket 203. A recess 200A (FIG. 11) is formed in the central portion of the other end surface of the light guide member 200, and a printed plate 204 for holding the light receiving element 13 so that the light receiving element 13 is positioned in the recess 200A is fixed to the light guide member 200. A reflecting material is deposited by evaporation on the other side of the light guide member 200. A light ray a emitted from the light emitting element 12 is reflected by the reflecting member 114, and the reflected light b is incident on the end surface 200B of the light guide member 200, and this incident light is reflected within the light guide member 200 and enters the light receiving element 13. In this embodiment, the light emitting element 12, the light receiving element 13 and the light guide member 200 are formed integrally with one another and the reflected light from the reflecting member 114 reliably enters the light receiving element 13 and therefore, it is not necessary to adjust the optical arrangement of the light emitting element and the light receiving element.

Figure 12:
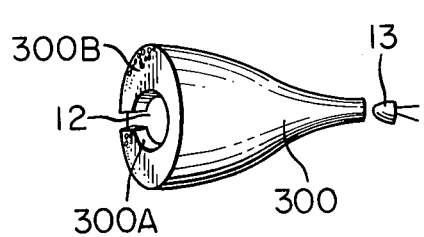
FIGS. 12 and 13 are perspective views showing further embodiments of the light guide member.
Figure 13:
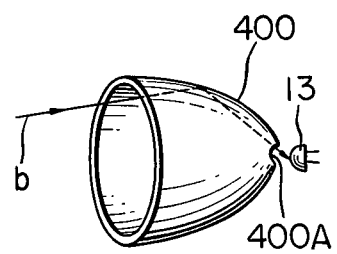

FIGS. 12 and 13 show further embodiments of the light guide member. In FIG. 12, the light guide member comprises a conical optical fiber bundle 300, and a recess 300A is provided in the central portion of one end surface of the optical fiber bundle 300 and the light emitting element 12 is disposed in the recess 300A. Light rays having entered the end surface 300B of the optical fiber bundle 300 are directed toward the light receiving element 13 by the optical fiber bundle. In FIG. 13, the light guide member comprises a hollow conical member 400 having a mirror surface therein, and a hole 400A is provided at the top of the conical member and the light receiving element 13 is disposed in opposed relationship with the hole 400A. A light ray b having entered from the open end 400B of the conical member 400 is reflected by the inner surface thereof and travels toward the light receiving element 13.

In FIG. 9, if the fore end of the light emitting element 12 is formed into a convex lens shape so that the light from the light emitting element is converged as a parallel light beam or in a certain range, the light beam emitted from the light emitting element 12 can be more effectively applied to the reflecting member 114 and more reflected light of the illuminating light can be made to enter the entire area of the concentric light receiving surface 200B centered at the light emitting element, so that the difference in quantity of light between the time when the sheet is present and the time when the sheet is absent becomes very great to enable more reliable detection of the sheet to be achieved.

According to the present invention, as has been described above, a sheet having a transparent portion such as film can be reliably detected and there is no possibility of malfunction occurring. However, in the case of a construction in which sheets are transported between a pair of transparent glass members, if the principal optical axis of the illuminating light relative to the glass members is made to have an incident light angle larger than the critical angle at which total reflection is caused on the surface of the glass, the illuminating light will always be totally reflected by the surface of the glass members and the light will not reach the reflecting member 14, 114 and accordingly, even when a sheet is absent, the light receiving element 13 cannot detect the reflected light reflected by the reflecting member 14, 114. Thus, it is necessary that the principal optical axis of the illuminating light relative to the glass members be set to an incident light angle smaller than the critical angle at which total reflection is caused on the surface of the glass, namely, to such an angle that the light is not totally reflected by but passes through the surface of the glass.

As had hitherto been described, the present invention solves the difficulties peculiar to the prior art by a simple construction and whether the moving sheet is transparent, non-transparent or varied in planarity, the sheet can be accurately detected and any special adjustment of the optical position is required and thus, the provision of a detecting device which is easy to maintain and low in cost has become possible.

What is claimed is:

1. A sheet detecting device for detecting a sheet advancing along a predetermined path comprising:
   a light source for emitting a light ray in a predetermined direction of said path;
   a light reflecting member disposed at a position opposite to said light source in respect of said path, said light reflecting member being disposed such that the angle formed by a bisecting line between the light incident on said light reflecting member and the light reflected by said light reflecting member with a line normal to the surface of the sheet is larger than the critical angle causing the total reflection of the ray on the surface of the sheet; and a light receiving element disposed at a position opposite to said light reflecting member in respect of said path for receiving the light ray of the light source reflected by said light reflecting member.

2. The sheet detecting device according to claim 1, wherein said reflecting member has a planar reflecting surface and said bisecting line is a normal to said reflecting surface.

3. A device according to claim 1, wherein said light reflecting member has a plurality of reflecting surfaces intersecting at a predetermined angle for exiting the incident light in a predetermined direction after plural numbers of reflections.

4. The sheet detecting device according to claim 1, wherein said reflecting member has a number of minute spherical beads disposed on the surface thereof.

5. The sheet detecting device according to claim 1, wherein said reflecting member has a number of reflecting surfaces intersecting one another at an angle of 90° or greater.

6. The sheet detecting device according to claim 1, wherein said sheet is a transparent or non-transparent sheet.

7. A device according to claim 1, wherein said light reflecting member has on its surface a plurality of spherical bodies for reflecting the incident light inside of the reflecting member to cause it to exit in a direction parallel to that of the incident light.

8. The sheet detecting device according to claim 1 or 7, wherein a light guide member is disposed between said light source and said light receiving element and the light ray reflected by said reflecting member enters said light receiving element through said light guide member.

9. The sheet detecting device according to claim 8, wherein said light guide member is of a conical shape and said light source is disposed on one end of said cone and said light receiving element is disposed on the other end of said cone.

10. The sheet detecting device according to claim 8, wherein said light guide member comprises an optical fiber bundle.

11. The sheet detecting device according to claim 8, wherein said light guide member is formed of transparent glass.

12. The sheet detecting device according to claim 9, wherein said light guide member comprises a hollow member having a reflecting surface therein.

13. A sheet detecting device according to claim 9, wherein said light guide member is formed of transparent glass.

14. A sheet detecting device according to claim 9, wherein said light guide member comprises an optical fiber bundle.

* * * * *

UNITED STATES PATENT AND TRADEMARK OFFICE
CERTIFICATE OF CORRECTION

PATENT NO. : 4,484,070

DATED : November 20, 1984

INVENTOR(S) : SHUNZO INOUE

It is certified that error appears in the above-identified patent and that said Letters Patent is hereby corrected as shown below:

Column 3, line 3, after "numeral" insert --14--;

Column 4, line 57, before "surface" insert --line normal to the--; after "the" (second occurrence) delete "line normal to the".

Column 6, line 42, after "to" insert --have--.

Signed and Sealed this

Thirty-first Day of December 1985

[SEAL]

Attest:

DONALD J. QUIGG

Attesting Officer

Commissioner of Patents and Trademarks